United States Patent
Hasan et al.

(10) Patent No.: US 8,954,422 B2
(45) Date of Patent: Feb. 10, 2015

(54) QUERY SUGGESTION FOR E-COMMERCE SITES

(75) Inventors: Mohammad Al Hasan, Fortville, IN (US); Nishith Parikh, Fremont, CA (US); Gyanit Singh, San Jose, CA (US); Neelakantan Sundaresan, Mountain View, CA (US); Brian Scott Johnson, Campbell, CA (US); Udayan Khurana, College Park, MD (US)

(73) Assignee: eBay Inc., San Jose, CA (US)

( * ) Notice: Subject to any disclaimer, the term of this patent is extended or adjusted under 35 U.S.C. 154(b) by 334 days.

(21) Appl. No.: 13/193,586

(22) Filed: Jul. 28, 2011

(65) Prior Publication Data

US 2012/0036123 A1    Feb. 9, 2012

Related U.S. Application Data

(60) Provisional application No. 61/369,611, filed on Jul. 30, 2010, provisional application No. 61/380,160, filed on Sep. 3, 2010.

(51) Int. Cl.
*G06F 17/30* (2006.01)
*G06Q 30/02* (2012.01)

(52) U.S. Cl.
CPC .... *G06F 17/30646* (2013.01); *G06F 17/30386* (2013.01); *G06F 17/3064* (2013.01); *G06Q 30/02* (2013.01)
USPC .................................. 707/723; 707/E17.084

(58) Field of Classification Search
USPC ........................................................ 707/723
See application file for complete search history.

(56) References Cited

U.S. PATENT DOCUMENTS

| 7,958,141 B2* | 6/2011 | Sundaresan et al. .......... 707/769 |
| 2004/0034652 A1 | 2/2004 | Hofmann et al. |
| 2007/0061335 A1 | 3/2007 | Ramer et al. |
| 2007/0087756 A1* | 4/2007 | Hoffberg ...................... 455/450 |
| 2009/0204573 A1 | 8/2009 | Neuneier et al. |
| 2009/0254971 A1* | 10/2009 | Herz et al. ........................ 726/1 |

(Continued)

FOREIGN PATENT DOCUMENTS

WO   WO-2012016194 A1   2/2012

OTHER PUBLICATIONS

"International Application Serial No. PCT/US2011/45980, International Search Report mailed Dec. 16, 2011", 3 pgs.

(Continued)

*Primary Examiner* — Shyue Jiunn Hwa
(74) *Attorney, Agent, or Firm* — Schwegman Lundberg & Woessner, P.A.

(57) ABSTRACT

Providing query suggestions using a query log including a number of user sessions that comprise training data including a sequence of a plurality of sets of queries. Some of the sets of queries include query transitions followed by a purchase related event. The query log is cleaned and normalized. Query log stationary scores and transition scores of at least some of the plurality of sets is generated. A set of query suggestions is built and similarity scores are computed for at least some of the set of query suggestions to determine whether individual ones of the at least some of the set of query suggestions meet a predetermined assurance level. Those that meet the level are included as elements of the set of query suggestions that meet the predetermined assurance level. That set of query suggestions are mixed and ranked in accordance with a user behavior sought to be optimized.

23 Claims, 13 Drawing Sheets

(56) References Cited

U.S. PATENT DOCUMENTS

| | | | | |
|---|---|---|---|---|
| 2009/0271342 | A1* | 10/2009 | Eder | 706/20 |
| 2010/0125572 | A1* | 5/2010 | Poblete et al. | 707/722 |
| 2010/0188689 | A1 | 7/2010 | Gnanasambandam et al. | |
| 2011/0047076 | A1* | 2/2011 | Carlson et al. | 705/44 |
| 2011/0231380 | A1* | 9/2011 | Sadagopan et al. | 707/706 |
| 2011/0231390 | A1* | 9/2011 | Inagaki et al. | 707/721 |
| 2011/0258049 | A1* | 10/2011 | Ramer et al. | 705/14.66 |
| 2012/0137367 | A1* | 5/2012 | Dupont et al. | 726/25 |

OTHER PUBLICATIONS

"International Application Serial No. PCT/US2011/45980, Written Opinion mailed Dec. 16. 2011", 9 pgs.

Boldi, Paolo, et al., "The Query-flow Graph: Model and Applications", CIKM '08, Retrieved online Dec. 5, 2011 at: <http://clair.si.umich.edu/~radev/767w10/papers/Week09/search_log_mining/Boldi08.pdf>, entire document, (Oct. 26-30, 2008), pp. 609-617.

"International Application No. PCT/US2011/045980, International Preliminary Report on Patentability mailed Feb. 14, 2013", 7 pgs.

"Welcome to Apache™ Hadoop™!", http://hadoop.apache.org./, (Jun. 14, 2011).

Al Hasan, Mohammad, et al., "Query suggestion for E-Commerce sites", WSDM '11 Proceedings of the Fourth ACM International Conference on Web Search and Mining, (2011), 765-774.

Baeza-Yates, R., et al., "Query Recommendation Using Query Logs in Search Engines", Proceedings of Extended Database Technology (EDBT) Workshops, (2004), 10 pgs.

Dean, J., et al., "MapReduce: simplified data processing on large clusters", Communications of the ACM, 51(1), (Jan. 2008), 107-113.

Parikh, N., et al., "Inferring semantic query relations from collective user behavior", CIKM '08 Proceeding of the 17th ACM Conference on Information and Knowledge Management, (2008), 349-358.

Sundaresan, Neel, et al., "Scalable Stream Processing and Map-Reduce", http://www.slideshare.net/cloudera/hw09-analytics-and-reporting, (2009).

\* cited by examiner

| Query Phrase | Result Size | | Frequency |
|---|---|---|---|
| | (eBay) | (Amazon) | (eBay) |
| dora the explorer speaking doll | 0 | 0 | 0 |
| dora the explorer doll speaks | 0 | 0 | 0 |
| dora the explorer talking doll | 41 | 45 | 220 |
| dora the explorer doll talks | 7 | 1 | 1 |
| dora the explorer doll with voice | 0 | 0 | 0 |

*FIG. 5A*

| dora the explorer doll | All Categories ▽ |
|---|---|

Related Searches: dora the explorer toys, dora the explorer talking doll, dora the explorer bedding, dora doll, dora the explorer doll house

*FIG. 5B*

| Raw association data | De-duplicated user association data |
|---|---|
| fluke, texas instrument, adding machine, pocket knife, ti84, scientific calculator | casino calculator, scientific calculator, calculator hp, texas instrument, ti84, adding machine |

QUERY SUGGESTION FOR E-COMMERCE SITES

CROSS-REFERENCE TO A RELATED APPLICATIONS

This application claims the benefit of United States Provisional Patent Application entitled "Query Suggestions for E-Commerce Sites", Ser. No. 61/369,611, filed on Jul. 30, 2010, and United States Provisional Patent Application entitled "Probabalistic Optimization of Related Searches" Ser. No. 61/380,160, filed on Sep. 3, 2010, the entire contents of which are herein incorporated by reference.

BACKGROUND

Query suggestion is an integral part of search engines. Query suggestion applications for the e-commerce domain face challenges that differ from those faced by query suggestion applications for the web search domain.

BRIEF DESCRIPTION OF THE DRAWINGS

Some embodiments are illustrated by way of example and not limitation in the figures of the accompanying drawings in which:

FIG. 5A and FIG. 5B are examples of frequent variants of a search phrase and related query suggestions;

DETAILED DESCRIPTION

In the domain of e-commerce and web search, query suggestion is an important assistive feature that helps both focused and exploratory visitors. For focused visitors, this feature enables them to reformulate their query appropriately so that the desired object (an item or a web page) can be retrieved in a shorter time. For exploratory visitors, it provides a means for discovery. Today, popular search engines support query suggestion. Typically, the search result pages (SRP) for a query contain a list of suggestion queries which might be more appropriate to satisfy the visitors' information need.

Recently, there have been significant research efforts in the field of query suggestion. While most of the work focuses on the web search platform, this feature is equally important for e-commerce platforms such as eBay or Amazon.

Example methods and systems for query suggestion are described. In the following description, for purposes of explanation, numerous specific details are set forth in order to provide a thorough understanding of example embodiments. It will be evident, however, to one skilled in the art that embodiment of the present invention may be practiced without these specific details.

Figure 1:
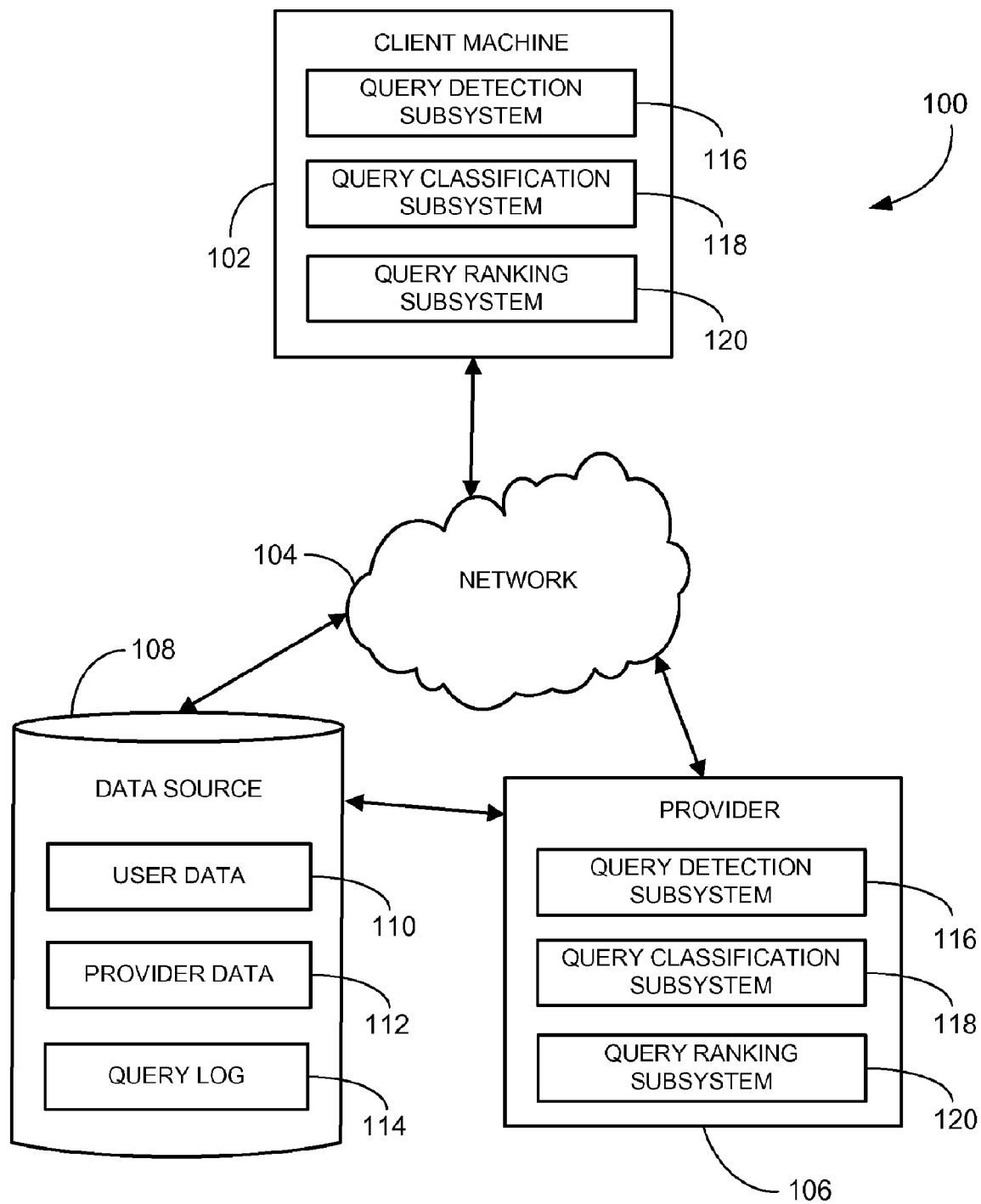
FIG. 1 is a block diagram of a system, according to example embodiments.

FIG. 1 illustrates an example system 100 in which a client machine 102 may be in communication with a provider 106 over a network 104. A user may communicate with the provider 106 and/or a client machine 102 to receive information associated with queries. Further embodiments involving query bursts query costs may also be included as described in U.S. Pat. No. 7,958,141.

Examples of the client machine 102 include a set-top box (STB), a receiver card, a mobile telephone, a personal digital assistant (PDA), a display device, a portable gaming unit, and a computing system; however other devices may also be used.

The network 104 over which the client machine 102 and the provider 106 are in communication may include a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The provider 106 may also be in communication with a data source 108. The data source 108 may include user data 110, provider data 112, and/or a query log 114. The user data 110 may include information regarding users of the provider 106. The provider data 112 may include information regarding searches and/or transactions conducted with the provider 106. For example, the sale of an item from one user to another may be stored as the provider data 116. The query log 114 may be a log of a number of queries to the data source 108 and/or a different data source. The query log 114 may be from eBay Inc., of San Jose, Calif. or from a different provider 106.

The provider 106 and/or the client machine 102 may include a query detection subsystem 116, a query classification subsystem 118, and/or a query ranking subsystem 120. The query detection subsystem 116 detects queries during one or more time periods (e.g., days). The query classification subsystem 118 may classify a query. The query ranking subsystem 120 ranks a query in any manner desired.

In an example embodiment, the system 100 may be a part of an online content or electronic commerce system. The query detection, classification, and/or ranking may be used for a wide variety of purposes including merchandizing, creating traffic stickiness, load handling on applications, building query logs, and fraud detection. The queries coming into an online system provide a good proxy for information flowing through a system in the form of streams. In online communities, query frequency and variation on frequencies carry information about wisdom of crowds and about events, trends, things in vogue or products in demand. The detection of queries can be leveraged for a variety of applications that feed on various kinds of demand information.

Figure 2:
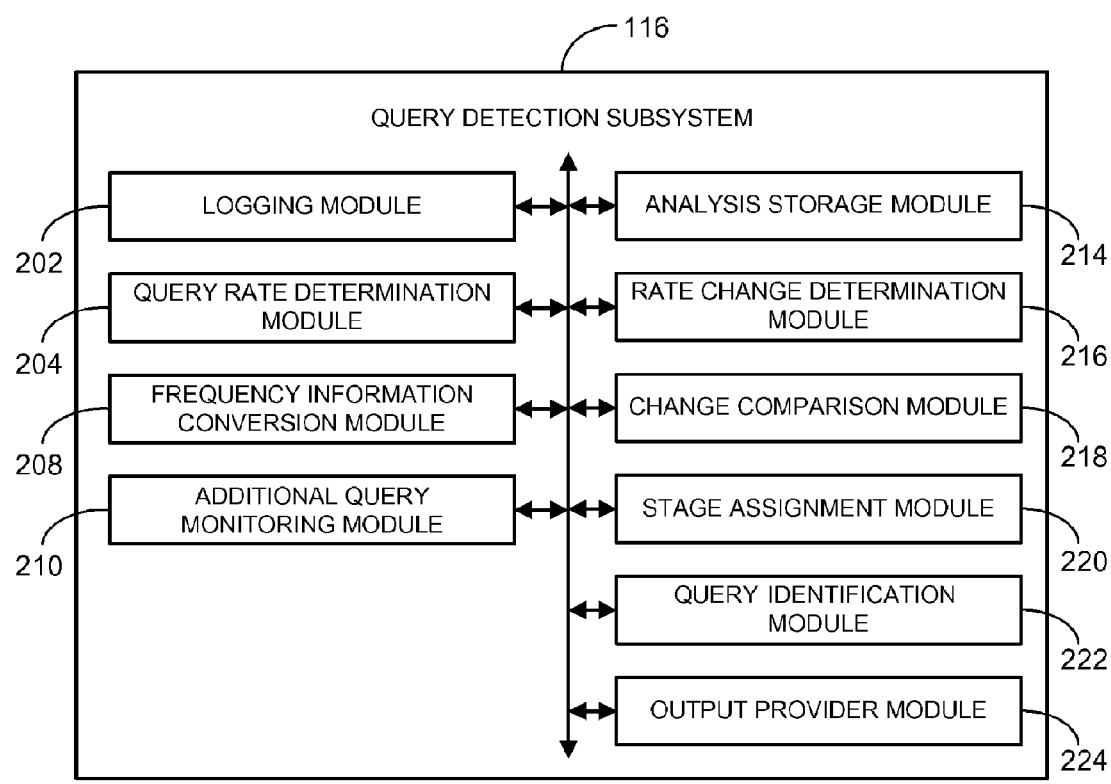
FIG. 2 is a block diagram of an example query detection subsystem that may be deployed within the system of FIG. 1 according to an example embodiment.

FIG. 2 illustrates an example query detection subsystem 116 that may be deployed in the provider 106 and/or the client machine 102 of the system 100 (see FIG. 1) or otherwise deployed in another system. The query detection subsystem 116 may include a logging module 202, a query rate determination module 204, a frequency information conversion module 208, an additional query monitoring module 210, an analysis storage module 214, a rate change determination module 216, a change comparison module 218, a state assignment module 220, a query identification module 222, and/or an output provider module 224. Other modules may also be included.

The logging module 202 may log a number of queries to the data source 108. The logging may be stored in the query log 114 or may be otherwise retained.

The query rate determination module 204 may determine a rate of queries to the data source 108 for each time period of a number of time periods. The queries may be associated with a term. The determination of the rate may be based on the logging of the queries. A time period may be a day or a longer or shorter period of time. A period of time associated may be, by way of example, a period of three months or a period of five months. However, other periods of time may also be used.

The frequency information conversion module 208 may convert frequency information for a particular query into a time series. The frequency information may be daily frequency information or frequency information for a different time period. The time series may indicate timestamps of the arrival of the queries associated with a term.

The additional query monitoring module 210 may monitor additional queries to the data source. The additional queries may be associated with the term.

The analysis storage module 214 may store a result of the performing cost minimization analysis. The rate change determination module 216 may determine a rate of change of percentage volume for the additional queries to the data source.

The change comparison module 218 may compare the rate of change of percentage volume for the additional queries associated to a rate of change of volume for the additional queries associated.

The state assignment module 220 may assign a normal query state or a deviated query state to a particular query on a time period and/or for an additional time period. The normal query state may reflect a normal frequency of queries and/or a normal volume of queries (e.g., to the data source 108, for a particular category, etc.). The deviated query state may reflect a deviated frequency of queries and/or a deviated volume of queries.

The assignment may be based on the rate of queries for the time period, frequency information, a normal query state cost, a normal-to-deviated query state transition cost, a deviated query state cost, a deviated-to-normal query state transition cost, the cost minimization analysis, the comparing performed by the change comparison module, and/or the converting of the frequency information. In an example embodiment, a state machine may be used to assign the normal or the deviated query state for a query.

The query identification module 222 may be used to identify queries during the time periods and/or an additional time period. The identification may be based on an assignment of the normal query state or an assignment of the deviated query state to the queries and/or a particular query.

The output provider module 224 may provide an output. The output may include identification of the queries. The output may be based on a determination of the rate of the queries and/or on assignment of the normal query state or the deviated query state. The output may include, by way of example, a display of a rate change, a histogram of a popularity sort, or the like. Other outputs may also be provided.

Figure 3:
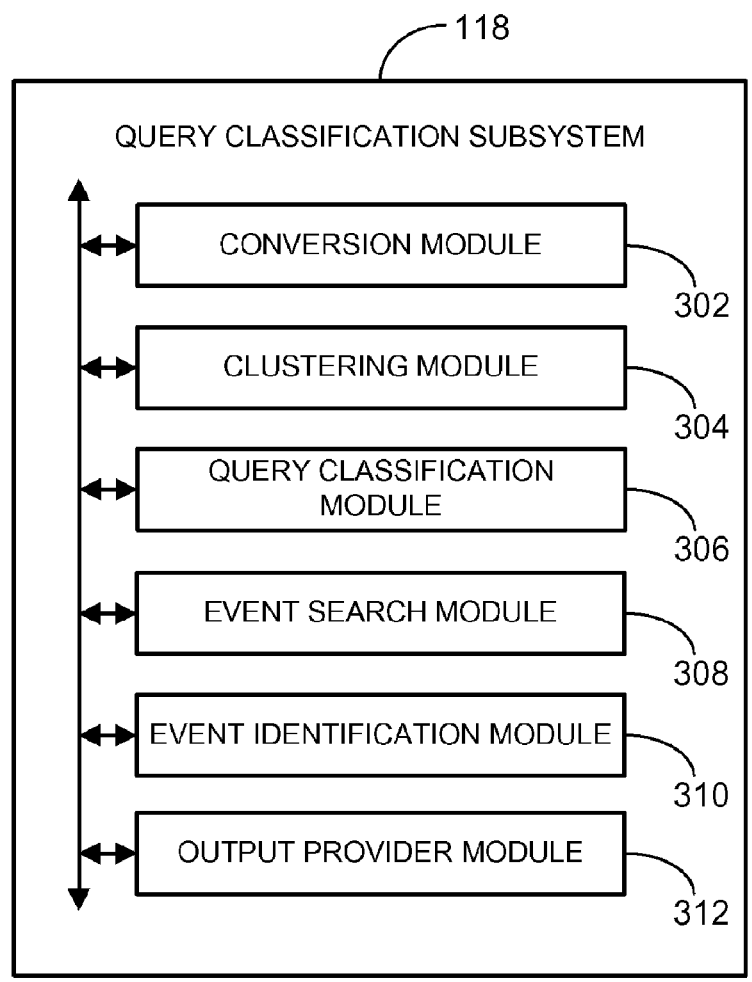
FIG. 3 is a block diagram of an example query classification subsystem that may be deployed within the system of FIG. 1 according to an example embodiment.

FIG. 3 illustrates an example query classification subsystem 118 that may be deployed in the provider 106 and/or the client machine 102 of the system 100 (see FIG. 1) or otherwise deployed in another system. The query classification subsystem 118 may include a conversion module 302, a clustering module 304, a query classification module 306, an event search module 308, an event identification module 310, and/or an output provider module 312. Other modules may also be included.

The conversion module 302 may convert the query if needed for subsequent clustering.

The clustering module 304 may apply a clustering technique to a result of the conversion of the query burst (e.g., a wavelet). For example, a distance (e.g., a Euclidean distance) between the wavelet and multiple centroids may be calculated. A centroid may be associated with a particular class of the classification. The clustering technique may be, by way of example, a K-means clustering technique. However, other clustering techniques may also be used. The K of the K-means clustering technique may be four, however other numbers including two, three, five, six, seven, or more than seven may also be used. In addition to k-means clustering, Hadoop clustering may be used. Hadoop clustering is well known as can be seen at http://hadoop.apache.org.

The query classification module 306 may classify the query based on application of the clustering technique by the clustering module. The classification of the query may be based on information relating to one centroid or multiple centroids.

The event search module 308 may search multiple events (e.g., external events) on one or more days associated with the queries. The events may include, by way of example, a news item, a launch of a product, a landmark television episode, an expected occasion, or an advertising campaign. Other events may also be searched.

The event identification module 310 may identify a particular event based on the classification. The identification of the particular event may be based on the search of the events.

The output provider module 312 may provide an output. The output may include identification of a particular event.

Figure 4:
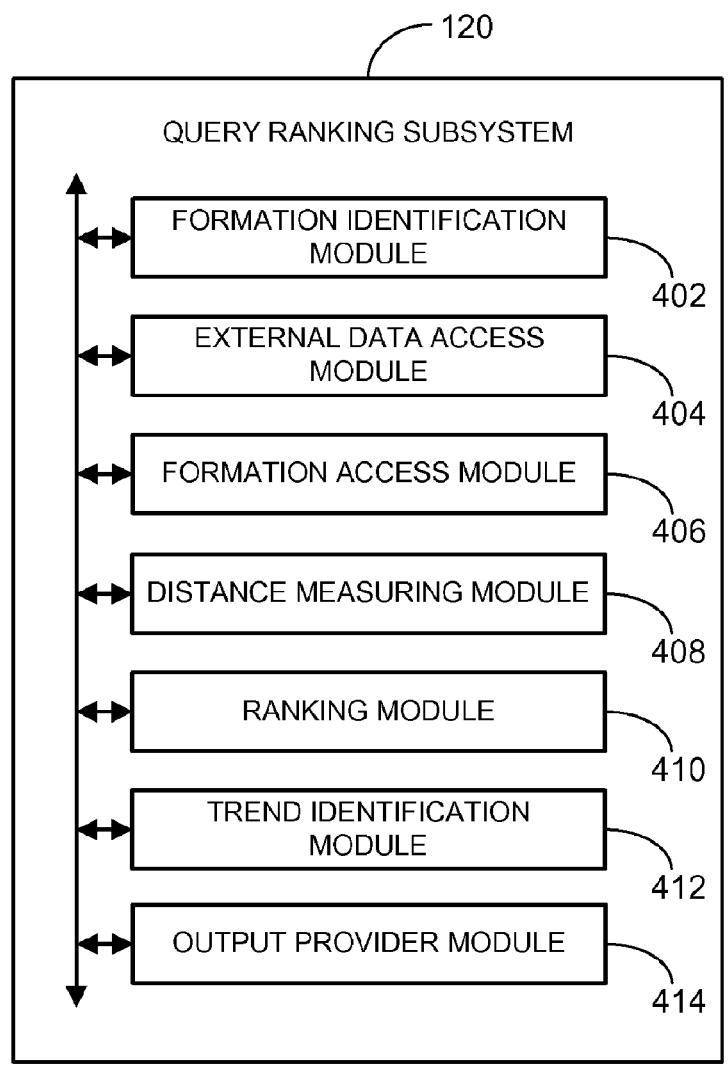
FIG. 4 is a block diagram of an example query ranking subsystem that may be deployed within the system of FIG. 1 according to an example embodiment.

FIG. 4 illustrates an example query ranking subsystem 120 that may be deployed in the provider 106 and/or the client machine 102 of the system 100 (see FIG. 1) or otherwise deployed in another system. The query ranking subsystem 120 may include a formation identification module 402, an external data access module 404, a formation access module 406, a distance measuring module 408, a ranking module 410, a trend identification module 412, and/or an output provider module 414. Other modules may also be included.

The formation identification module 402 may identify a graphic query formation (e.g., a waveform) among various queries. The external data access module 404 may access external data. The external data may include, by way of example, a news article, user activity, a newly listed item, or the like. The formation access module 406 may access a comparison graphic query formation.

The distance measuring module 408 may measure a distance between the graphic query formation and the comparison graphic query formation. The ranking module 410 may rank the queries based on the graphic query formation, a comparison graphic query formation, a distance, and/or external data. The trend identification module 412 may identify a trend based on the graphic query formation.

The output provider module 414 may provide an output. The output may include a ranking of the queries and/or identification of the trend. Some or all of the foregoing implementation may be used in the operation of the embodiments described herein.

One example of the use of query suggestions for use as queries can be seen from the following. A shopper on an e-commerce site wants to buy a talking doll that looks like the "dora" character in the popular children's cartoon "dora the explorer". How would she express her interest in the form of a typed query? FIG. 5A illustrates various alternative query phrases for this search endeavor along with the count of the results retrieved experimentally (on Jul. 20, 2010) on two popular e-commerce platforms, eBay and Amazon. Also illustrated is the monthly normalized (by user) frequency of these query phrases on eBay's search platform. The frequent variants of the search phrase can be seen to fetch the most number of items. A seasoned e-commerce shopper may have an idea about the most common variant of a query phrase, but others may find it difficult. In this scenario, query suggestion can help such shoppers to reformulate their queries correctly. For example, if a shopper types "dora the explorer doll", "dora the explorer talking doll" could be shown as one of the suggestions as in FIG. 5B. Consequently, a query suggestion module is an integral part of most search engines. It helps search engine users narrow or broaden their searches. Published work on query suggestion methods has mainly focused on the web domain. But, the module is also popular in the domain of e-commerce for product search.

As mentioned above, query suggestion in e-commerce is different from that in web search. This is due to some crucial reasons. On a site like the eBay marketplace items for sale are transient; they appear, get sold, and may or may not get replenished. This makes the suggestion task challenging. It may not be desirable to suggest queries for which there is no inventory. As visitors search for items with an intention to purchase, receiving a query suggestion for which there is no inventory this may have a negative monetary impact. This often happens with items and their associated queries that are popular for a brief span of time. Further, making an exploratory or serendipitous query suggestion when the user is focused on purchase might distract the user and have an adverse effect on the user's commitment to purchase. For example, for a query string "campfire popcorn" the query suggestion "gps" may look serendipitous to an exploratory shopper (both the queries may be related to the camping theme), whereas, a focused shopper may see it as a poor suggestion. In short, query suggestion in e-commerce needs to meet specific challenges which are not that prevalent for the same in the domain of web search. Nevertheless, the basic setup to obtain a query suggestion mechanism or module is the same or similar for both domains.

Query logs which, in one embodiment, include memory storage units and local processing units, utilize data from logging module 202, and can be used as the source of information for building query suggestion algorithms. Query log mining tasks can be performed in parallel using a distributed platform like Hadoop, which was reference above, and MapReduce, which is also well known may be reviewed in a paper by J. Dean and S. Ghemawat. Mapreduce: Simplified Data Processing on Large Clusters, volume 51, pages 107-113, New York, N.Y., USA, 2008. ACM.

The suggestion-set of a query may be automatically tailored according to the distribution of that query in the aggregated search traffic. For example, if a majority of the visitors behave as an exploratory visitor while using a specific query, it will be automatically reflected in its suggestion.

Another challenge is posed by the long tail nature of query distribution. For instance, for rare queries, the query log for a certain period of time may not have sufficient data to build confident suggestions. But, just increasing the period of query logs used may not improve the quality of results for all queries; for transient or seasonal queries, poor suggestions may appear. It can also happen that a suggestion would have zero search results. Hence, choosing the training data to maintain the delicate balance between coverage and Long Tail Problem is difficult and can be handled well by use of query logs.

The frequency of e-commerce queries follows a power-law distribution. As a consequence, high frequency queries (also called "head query" in the industry), have an extensive footprint in the search log and it is easy to find a set of high quality recommendation for these queries using session-based co-occurrence. On the contrary, the "tail queries" (low frequency queries) appear sporadically in the query log, so it is difficult to find good recommendations for those from session-based co-occurrence. But, it is the tail queries for which the suggestions are highly useful to the site visitors.

Figure 6A:
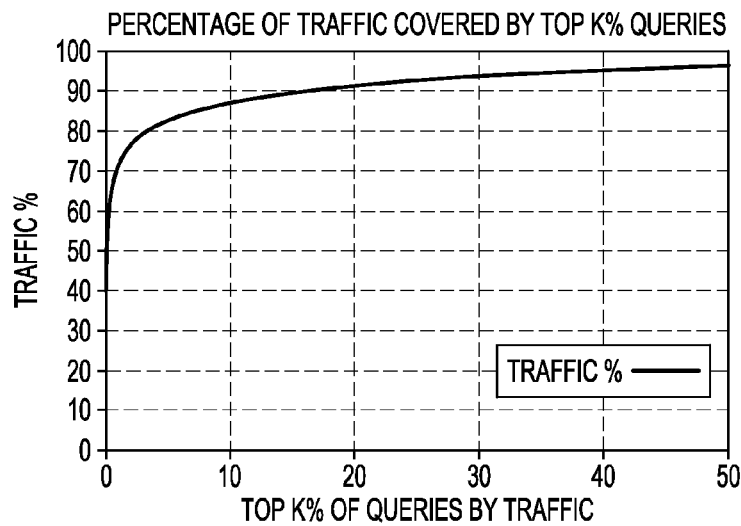
FIGS. 6A-6C are example graphs illustrating characteristics of e-commerce query distributions.
Figure 6B:
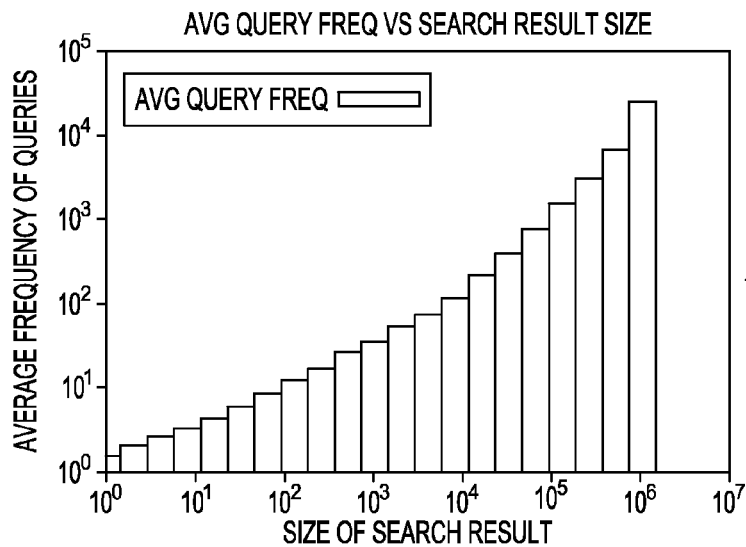
Figure 6C:
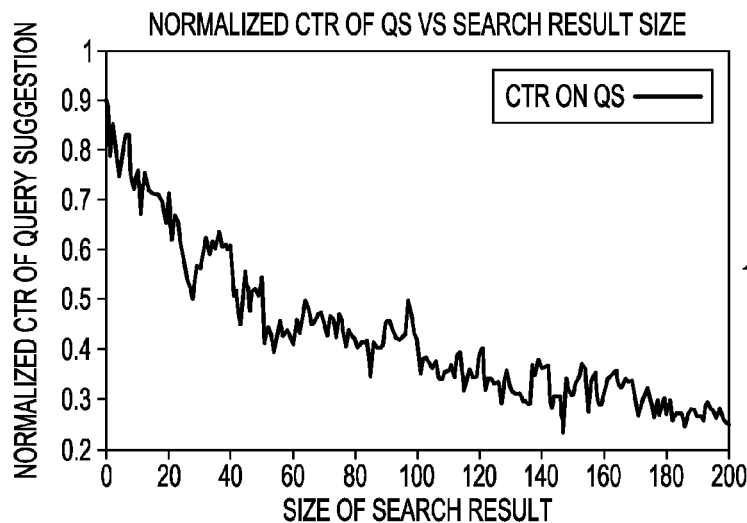

FIG. 6A-6C show details around queries, their frequencies and the relationship of result set sizes to query suggestion click-through rates. It is based on one week query log data from the electronics category in eBay comprising of approximately 20 million queries. This data is statistically stable so the trend will also be similar for a longer time frame. In FIG. 6A part of the long tail distribution is illustrated; 10% of the most frequent queries constitute about 87% of the search query traffic in the electronics category. For 20% of the most frequent queries cover almost 91% of the search traffic and for 50% of the most frequent queries, the coverage is about 96% of the search traffic. It clearly indicates that more than 50% of distinct eBay queries all together contribute to less than 5% of the query traffic. For all these queries session-based data is sparse.

It may be argued that if 90% coverage is obtained from less than 20% of queries, why address the remaining 80% queries that form the long tail. In some sense, just the head queries could be dealt with, without concern about the rest. However, for a site like eBay, long tail queries are important—they bring in money and they offer significant opportunity that the head queries do not.

Queries represent the demand side of the marketplace and the size of the retrieved item-set represents the supply counterpart. In the eBay marketplace, like in any healthy marketplace, the demand and supply correlates nicely. As shown in FIG. 6B, for instance, the set of queries having weekly frequency value less than 10, return, on an average less than 100 items. This low recall, typically, motivates the shoppers to use the assistive tools available on the site. FIG. 6C shows evidence in favor of this claim. The related search click-through rate (CTR) rises sharply as the recall values fall below 200. The CTR for recall value less than 10 is almost double than that for the recall value of 100. For long tail queries the shoppers need the most assistance, but unfortunately for those queries the session log contain sparse information to be able to help with query suggestion. The long tail in e-commerce brings in opportunities, but also clearly reveals that it also brings unique challenges to build machine-learned systems for query suggestion, clustering, or ranking.

Query Sparsity and Inventory Dynamics

Long tail queries make it difficult to build off-line suggestions for all user queries. Typically, query logs for a certain time period can be mined to build the related search suggestion index (a hashtable, where the key is the user query and the value is the set of suggestion queries). If a query does not appear in this time period, no suggestions can be built for it.

Figure 7A:
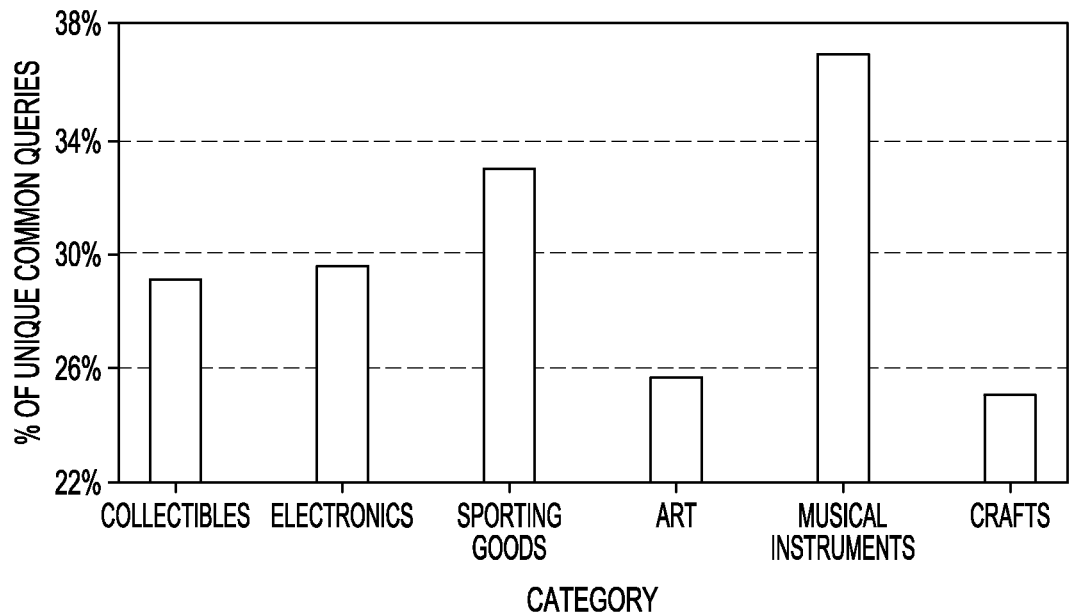
FIG. 7A illustrates e-commerce site query overlap over two consecutive days for different product categories.
Figure 7B:
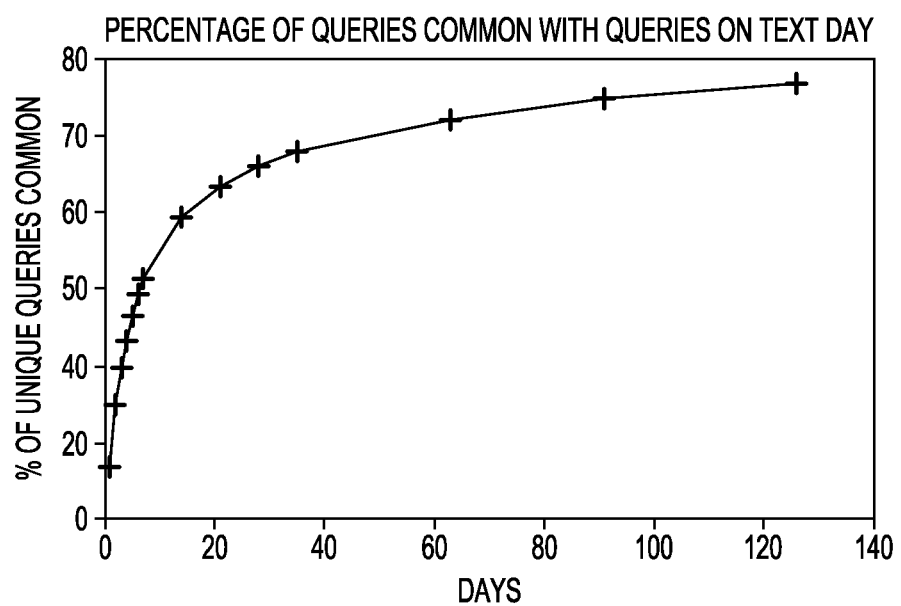
FIG. 7B illustrates e-commerce site query overlap over several days for the electronics product category.

In a study of one query log, all the distinct query strings were collected for two consecutive days. Around 30% of the queries from the first day also appear on the next day. So, an index built using the first day log ("training data") would have suggestion for only 30% of the distinct user queries executed on the second day. The number varies between 20 and 40 across different categories as shown in FIG. 7B. In studies of categories, like books, motors, and crafts, the long tail behavior is more pronounced, so for these categories, the number is lower. If additional days of training data are used to build the index, it can cover more user queries. This is shown in 7B, where the query log window is increased from one day to three months and show the percentage of user queries (on a day outside these training days) that is available in the index. However, increasing the training data arbitrarily has adversarial affect on the quality of the suggestions. For example, buzz queries (such as, world cup soccer 2010) or seasonal queries (such as Halloween, Christmas) could surface as a query suggestion during the wrong time period (after the event is gone or in the off-season). More importantly, for tail queries the suggestion might be good only for a certain period of time when the corresponding item is still available in the inventory. Otherwise, the suggestions can lead to no results causing user frustration. In one experiment, by increasing the training period by three times, the number of query suggestions leading to no inventory almost doubled.

Noisy Data

Query logs collected by various web sites such as, Google, Yahoo, Bing, and eBay, are generated by searches being performed on the search engine. In addition to humans performing searches, other sources that perform searches include bots or robots, API's used by external websites and programs, various add-ons and extensions installed in the browser, links and widgets embedded in website, for example, affiliate sites and social sites, such as, twitter and facebook.

Bots are programs that automatically issue queries and clicks to the search engine. Search assistive tools such as, related search, are intended for humans, so activities of bots in the log are noise and they compromise the quality of the related search index. In the web search domain, there are many studies that analyze the influence of bots and also suggest mechanisms to remove bot queries from the query logs. In the e-commerce case the bot effect seems to be more pronounced. The search logs are corrupted by unexpected queries or atypical frequencies of queries or advanced queries that humans are unlikely to type in. Aggressive bots perform extremely long search sessions with no contextual similarity. Search sessions (duration of each session is, typically, half an hour) have been observed with more than ten thousand searches in the query logs. Though these are easy to tag, there are bots that perform small number of searches in a session; these are hard to catch. Widgets and embedded links also generate large quantity of searches which look perfectly legitimate. In many cases, these are hard to tag and remove.

Figures 8, 9:
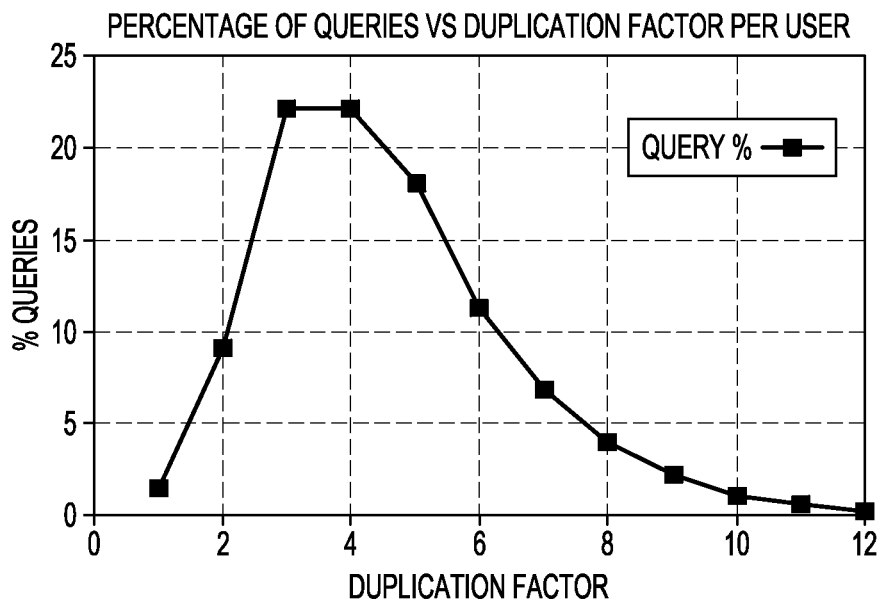
FIG. 8 illustrates example query and query co-occurrence duplication factors per user.
FIG. 9 is an example of suggestions for the query calculator, according to one example.

Also observed are unique users performing multiple searches with the same seed query. This is partly because users search for longer time period to make a purchase decision. Another reason is that, the e-commerce search engines take other input fields besides the query as refinement mechanism, for e.g. price range, category, item condition, zip-code etc. When a constraint is applied, the query text in the query log remains the same, but the search contributes to the duplication factor of that query. But, this factor is different for different queries. FIG. 8, illustrates that 60% of the queries have four or fewer instances per user per week, whereas remaining 40% has more than four. The skewness in query multiplicity rate can adversely affect the query co-occurrence statistics. For tail queries, where the actual frequency is low this can give rise to sub-optimal or poor query suggestion. For example, training on the same data set and the same algorithm, the suggestion set can vary based on whether the raw association count or the distinct user association count is considered. FIG. 9 shows the suggestion-list for the query "calculator". It is easy to see that the suggestions from the second case are better; "fluke" and "pocket knife" are not attractive suggestions for the query "calculator" and those have been thrown away when the query association data are de-duplicated by the distinct users.

Normalization by the distinct user count is a form of cleaning (noise removal). But, much more aggressive cleaning techniques can be used, such as those suggested in the papers R. Cooley, B. Mobasher, and J. Srivastava. Data Preparation for Mining World Wide Web Browsing Patterns, Knowledge and Information Systems, 1:5-32, 1999; and N. Sadagopan and J. Li. Characterizing typical and atypical user sessions in clickstreams, In Proceeding of the International World Wide Web Conference, pages 885-894, New York, N.Y., USA, 2008. Rule based cleaning techniques can also be applied to clean the data; for example, a simple rule can be to ignore sessions without purchase events. The logic behind that is that the query associations learned from the successful user sessions would be much cleaner. But too aggressive cleaning of query logs can lead to loss of information and can be damaging for the tail queries. This phenomenon is identical to the precision-recall tradeoff; aggressive cleaning and can lead to more precise suggestion, but at the same time the recall dips sharply where there may not be any suggestions for many queries.

Evaluation Dilemma

For query suggestion in web search, click-through is the most important evaluation metric. A suggestion is helpful if it prompts a user to click on the results it retrieves. But, in e-commerce domain, besides clicking on the retrieved item, users can also perform subsequent purchase related actions, such as, saving in watch-list, making a bid to purchase or purchasing the item. Interestingly, many queries with high click-through score do not lead to a high purchase-related activity. For example, a query like "diamond ring "has an average daily view (click on a result-set) of 1500, out of those, on average 60 views lead to purchase. On the other hand, for the query "ring", the average daily view and purchase are 1250 and 160 respectively. So, the query "ring" is a better converting query and may qualify higher than "diamond ring" in query suggestion ranking One may also normalize the purchase performance score of a query by the dollar value of the items purchased through that query. Some may argue that purchase performance metric should not be emphasized highly, because, many visitors like to explore before they buy. Hence, a delicate balance needs to be adopted between click-through and purchase-through score of a query.

Query Suggestion System

Data

Queries can be used in user sessions from historical logs as training data to build the query suggestion index. The log comprises of a set of user sessions on the eBay site. Each session stores date, time, page type, guid (a browser cookie based id as a proxy of actual user id) and a set of user events sorted by time. Some example events include executing query, viewing/clicking on search result, bidding on or purchase of an item, changing sort order of retrieved products, clicking on related search suggestion, clicking on aspect based filtering, etc. The size of the query log files for a day can be in the range of few hundred GBs. To build a query suggestion index, one month of search logs as training data can be used. Processing such large volume data requires a scalable distributed environment and a Hadoop based distributed cluster environment can be used. Majority of the tasks in the suggestion building mechanism are pushed to the Hadoop cluster.

The code of the process that runs on the cluster may be written in MQL (Mobius 5 Query Language), a MapReduce based scalable log processing system query language processor seen in the paper G. Singh, C. Evan, and S. Neel. Mobius: Large Scale Data Processing System. In Hadoop World '09, New York, N.Y., USA, 2009, also available on http://www.slideshare.net/cloudera/hw09-analytics-and-reporting. MQL is a SQL like query language with additional primitives and operators to specifically process session flows in the query log data. The log data is time-ordered, semi-structured and hierarchical; so to process such data, MQL is based on a nested data model with representation for sequence data. It (MQL) formally defines the set of language operators where each operator has a parallel implementation in Hadoop using MapReduce paradigm. It supports relational operators for e.g. group, join, select, project. In addition to relational operators, it also supports order aware operators (sequence operators); for example, detecting and extracting of patterns in sequence data. This enables users to write scripts for ad-hoc data processing.

Figure 10:
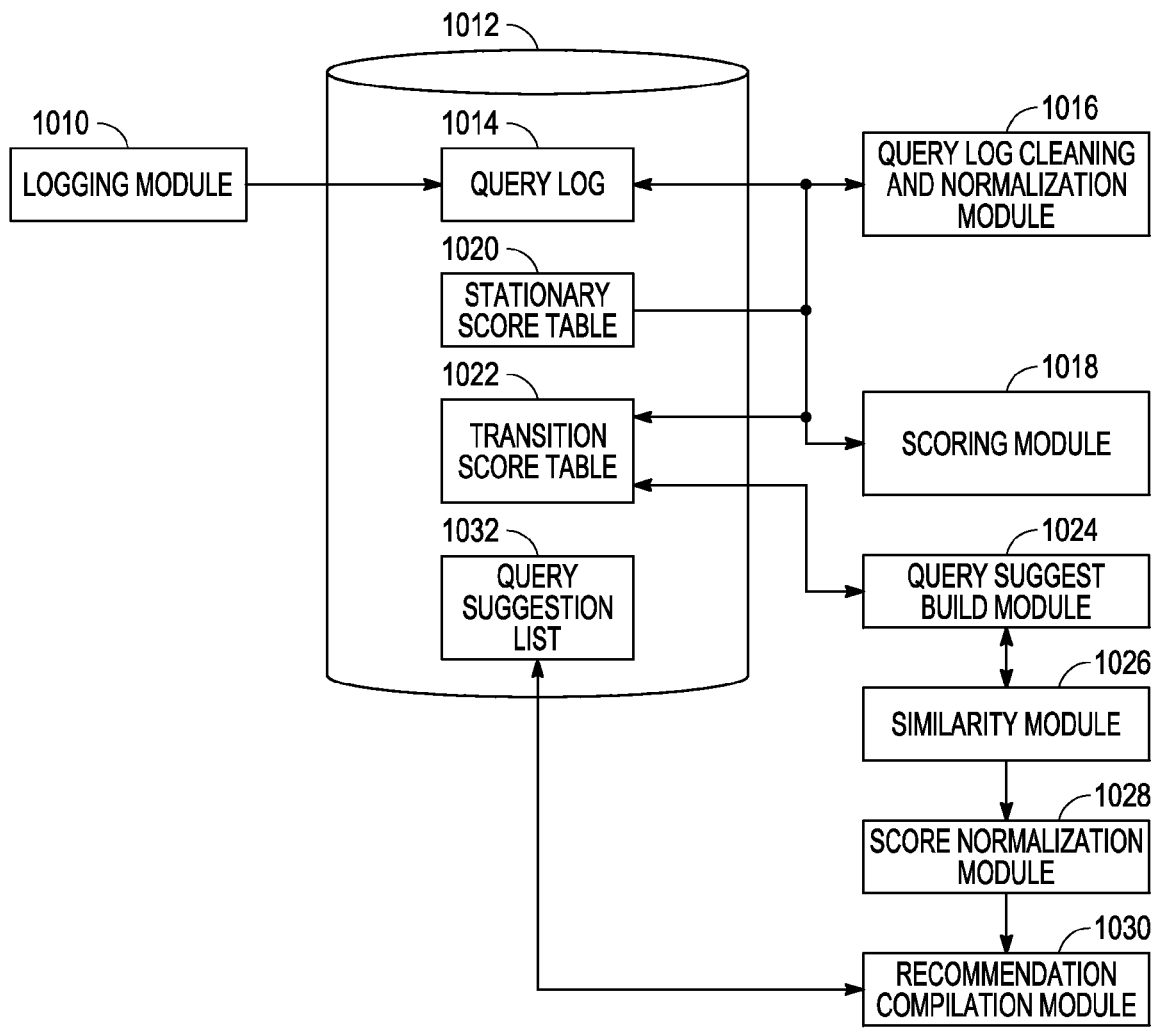
FIG. 10 is a block diagram of a system for building a query suggestion list according to an example embodiment.

FIG. 10 illustrates an example of an implementation of one embodiment disclosed herein. Within one or more storage devices 1012 are stored various databases. One such database is query log 1014 having a given number of sessions, each session comprising a sequence of queries followed by a purchase-related event. Query log 1014 may be generated using data from a logging module 1010 which is coupled to query log 1014. The query log cleaning and normalization module 1016 may be used for cleaning, comprising noise removal including such bot filtering, removal of black-listed queries, and other more aggressive cleaning techniques. Normalization may be done by, for example, user count. The query log cleaning and normalization module may scan over the sessions in the query log training data using scoring module 1018 to generate Stationary score table 1020 and transition table 1022. The rows in table 1020 and in table 1022 may correspond to independent queries. The columns may represent events. Each entry is the accumulated score of the row entity for the corresponding event. The linear combination of the scores in a row yields the purchase-efficiency score for the corresponding row entity. A query suggestion may be built using the ordered query-pairs from transition score table 1022. Tail queries may not have many suggestions in the query transition table 1022. In addition, the scores against those suggestions are smaller than a typical confidence schedule. Therefore similarity computation module 1026 may be used in an effort to resolve this issue. If the computed similarity assures a suggestion is acceptable it is retained. A recommendation compilation module 1030 then provides query recommendations for query suggestion list 1032 by performing the tasks of suggestion mixing and suggestion ranking Suggestion mixing may mix the suggestions to satisfy the need for visitors with different browsing intents. Suggestion ranking may be used to determine the rank by which the suggestion would be listed on the browser.

For mixing, two strategies can be followed: equal-mixing and natural-mixing. Equal mixing sorts the suggestions based on the final score in two different buckets—related and refinement—and takes equal number of suggestions from each bucket. Natural-mixing ranks the suggestions based on the final scores without considering the type.

Methods

Figure 11:
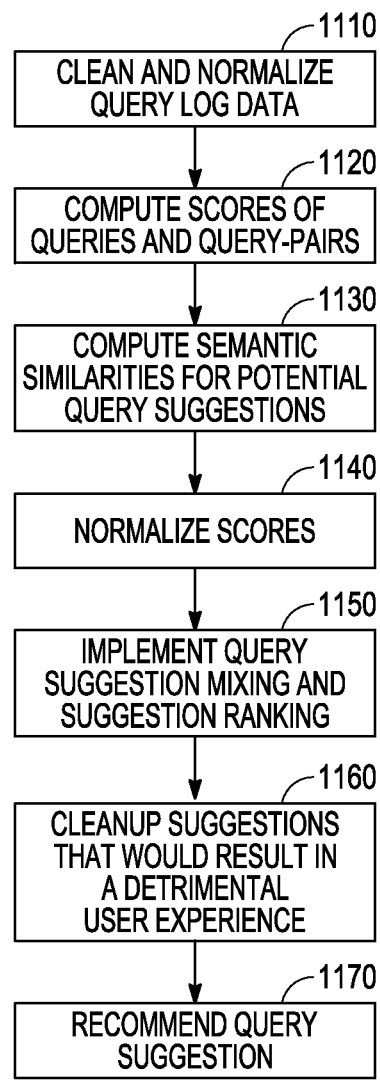
FIG. 11 is a flowchart illustrating the operation of the system of FIG. 10, according to an example embodiment.

FIG. 11 illustrates steps of a query suggestion building process disclosed herein.

Data Cleaning and Query Normalization.

Illustrated at the top of FIG. 11 is a data cleaning and query normalization process 1110 which may be performed by query log cleaning and moralization module 1016 on the query log 1014 of FIG. 10. It may include key steps like bot filtering, and the removal of black-listed and advanced queries. It also may perform simple stemming, like the phrase equivalence detection ("ipod nano new"→"new ipod nano", and "man shirt"→"men shirts"). Spelling corrections, synonym mapping ("superman"→"superman", "playstation 3"→"ps3", "rug"→"carpet"), may also be performed. Regarding stemming, it is important to note that the suggestion set always contains the most popular variant of a query from the set of equivalence query-set.

Compute Scores of Queries and Query-Pairs.

The second step 1120 in FIG. 11 may utilize a scoring module 1018 of FIG. 10 to compute scores corresponding to a queries and ordered pairs of queries of the query log 1014. The scores may comprise two factors: popularity and purchase-efficiency. Popularity of a query (q) or a query transition ($q_i \rightarrow q_j$) is its raw frequency in the training data. It is easy to compute using MapReduce, where the entities (query or query transition) are used as the keys and the count as the values to form the key-value pairs. On the other hand, the purchase-efficiency score of a query (or a query transition) is a composite score which is obtained by linear combination of various sub-scores that correspond to different purchase related events. All events that lead to purchase are considered, some example events are, "view", "save in watch list", "bid on an item" and "buy an item".

The sub-score of each purchase event can be computed by scoring module 1018 of FIG. 10. For this, each session of the query log 1014 can be considered as a sequence of queries followed by an event. Assume, in the query log, one session is composed of the following sequence: $q_1 \rightarrow q_2 \ldots \rightarrow q_n \rightarrow e$, where q's are the set of queries and e is a purchase related event. Then, the query qn and the ordered query-pair $q_{n-1} \rightarrow q_n$ (the arrow symbol denotes the order) accumulates a point for that event-type. For instance, the sequence "ipod→ipod nano→ipod nano 16 gb→view" would reward a point to the query "ipod nano 16 gb" and the query pair "ipod nano"→"ipod nano 16 gb" for the view event type. By scanning over all the sessions in the training data of query log 1014, two tables can be generated: stationary score table 1020 and transition score table 1022 discussed in more detail below. The rows in the stationary score table 1020 may correspond to independent queries and the same in the second table may correspond to ordered query pairs. The columns represent the events. Each entry in the table can be the accumulated score of the row entity for the corresponding event. One problem is that, some of the events happen rarely (as compared to others), so the entries in the above tables for those columns are mostly 0. For those events, transitive paths up to some user-defined distance can also be considered, but with a discount factor. In the above example, if the maximum distance of the transitive path for the view event is 2, and our discount factor is just the inverse of this distance, the query "ipod nano" and the query pair, "ipod"→"ipod nano 16 gb" would also accumulate ½ point from the above session. The linear combination of the scores in a row yields the purchase-efficiency score for the corresponding row entity using scoring module 1018 as shown in FIG. 10. The optimal weight of each event for linear combination can be learnt from historical market data analysis. MQL's built-in primitive to search for sequence pattern allows a user to write the above code in a simple SQL-like statement.

A query suggestion can be built using query suggestion build module 1024 as shown in FIG. 10 using the ordered query-pairs from the transition score table 1022. For the ordered query pairs in this table, the popularity score and the purchase efficiency score can be accumulated. If q→q1, q→q2, ... q→q1 are all the ordered pairs with q as the first entry, then the top-ranked set from {q1, q2, ... qn} forms the query suggestion for the query q. The ranking function is composed of both popularity and the purchase-efficiency score. It is discussed in details in the later paragraphs.
Compute Semantic Similarity.

Due to the query sparsity problem that discussed above, the infrequent queries (also called tail queries) may not have many suggestions in the query transition score table. Furthermore, the scores against those suggestions are smaller than a typical confidence threshold. For example, the popularity score of a transition may be defined as having to be at least 2 for it to become a suggestion but many suggestions for tail queries may not satisfy that. To overcome the problem, for tail queries alternative similarity measures can also be computed using similarity module 1026 as shown in FIG. 10, as performed at block 1130 of FIG. 11. Typical similarity metrics include edit distance based similarity, category based similarity, and query-product bi-partite graph based similarity. If these similarities assure that a suggestion is acceptable, it can be retained even if it does not satisfy the pre-defined confidence threshold.
Score Normalization by User-Based De-Duplication.

Session-log based similarity is vulnerable against malicious attacks or whimsical browsing by users. Consider a user running qi→qj transition in a script intentionally or unconsciously, then the popularity score of this transition could be high enough in the query log to make it a suggestion. It makes the suggestion algorithm vulnerable, because for many cases, the query qj may not be a good suggestion for the query qi for the majority of the users. To safeguard against such scenario, scores can be normalized using score normalization module 1028 as shown in FIG. 10, as performed at block 1140 of FIG. 11 by dividing the distinct number of users that practice this transition.

Since, user id is not always available, cookie based guid is used as a proxy to the user id. This process requires us to run a group by operation in MQL, using guid as the group key.
Recommendation Compilation.

A recommendation compilation module 1030 as shown FIG. 10 may perform two tasks, at block 1150 of FIG. 11, suggestion mixing and suggestion ranking The first mixes the suggestions to satisfy the need for visitors with different browsing intents and the second determines the rank by which the suggestions would be listed on the browser (from left to right or from top to bottom). For suggestion mixing, the suggestions may be classified in two broad classes: refinement and related. Refinement generally makes the search more constrained by adding more terms in the query phrase; for example, "ipod nano 16 gb" is a refinement for the query "ipod nano". This class of suggestions helps the focused buyer to choose the matching item easily by decreasing the size of the retrieved item set. Suggestions that do not fall into refinement class are called related. This class of suggestions helps exploratory buyers by offering them various alternative choices. Usually for different categories, different set of suggestions are more appropriate. Say, for antiques category, the visitor may not be aware of the entire spectrum of the selection, so related suggestions may be more appropriate, whereas for electronics the visitor may already know the product well, so a refinement may help her reach the desired item faster.

For mixing, two strategies can be used: equal-mixing and natural-mixing. Equal mixing sorts the suggestions based on the final score in two different buckets—related and refinement and takes equal number of suggestions from each bucket. Natural-mixing ranks the suggestions based on the final scores without considering the type.

For every query in a suggestion set there can be two scores: the popularity score and the purchase efficiency score. Suggestion ranking combines these two scores with different weights. The optimal weight is difficult to determine unless one has a clear idea of the function that (s)he wants to optimize. As discussed above, the evaluation dilemma is an obstacle to determine these weights. Various weighting schemes have been tried. One interesting observation is that, if the purchase efficiency score is prioritized, the recommendation set contains more refinement recommendation.

Stated another way, how recommendations are mixed matters. Recommendations should be mixed based on what it is desired to optimize. For example, for faster purchases mixing may be done in one way, for more user engagement and stickiness to site mixing might be done in some other way and so on. The right mixing strategy can be learned by launching different mixes to a user population for testing, measuring impact and then reiterating after adjustment.

Consider the following example.

Stationary Table:

| Query | Frequency | Views | Purchases |
|---|---|---|---|
| ipod | 2 | 1 x alpha | 1 x alpha2 |
| ipod nano | 1 | 1 x alpha3 | 1 x alpha4 |
| ipod nano 16 gb | 1 | 1 | 1 |
| zune | 1 | 0 | 0 |

Query Transition Table:

| Query Pair | Frequency | Views | Purchases |
|---|---|---|---|
| ipod → ipod nano | 1 | 1 x gamma2 | 1x gamma3 |
| ipod nano → ipod nano 16 gb | 1 | 1 | 1 |
| ipod → ipod nano 16 gb | 1 x gamma | 1 x gamma4 | 1 x gamma5 |
| ipod → zune | 1 | 0 | 0 |

Gamma* and alpha* are some factors (<1) used to diminish the counts when they are not direct (more than a single hop away in the user's behavioral path)
Recommendation Cleaning.

Query suggestions resulting in no search results have a detrimental impact on the user experience. So, the index against this mishap can be guarded against safeguard the index against this mishap as shown at block 1160 in FIG. 11. In this step, the suggestions that could potentially lead to such situations can be cleaned up. The historic retrieval count distribution of every suggestion query can be tracked and a classifier that predicts the probability with which a query may return a null SRP on the live site can be learned. For all queries, that have high value for this probability, their actual result count can be found on the production query server; the queries that return a null result set, are dropped from the suggestion list.

Evaluation Metrics

Various metrics can be used for evaluation. The following four are the significant among. These metrics are computed with respect to the query traffic, not the distinct queries.

Impression Rate: Not all queries have suggestions. The impression rate defines the percentage of queries that have suggestions. The higher the impression rate, the better the users' browsing experience. Associated with every user query, the query log typically saves a Boolean variable regarding the presence of the related search impression for that query. From that information, the impression value can be computed off-line.

ClickThrough Rate (CTR): Query suggestion may not be always useful to a user. But, to get the feedback of the users, the query log also records another Boolean variable to denote whether a user executed a query by clicking on a query suggestion. ClickThrough rate computes the percentage of user clicks on any of the suggestion, given that at least one suggestion was impressed for that query. It can be computed easily from the query log.

Suggestions Leading to null Search Result Pages: This is an important metric for e-commerce domain. Shoppers put their trust on the assistive features on a site, so they expect the suggestion to be useful. Simply put, query suggestion should never lead to a Search Result Page (SRP) with zero products. But, due to the volatile nature of e-commerce marketplace, it is difficult to completely eliminate this. This metric computes the percentage of query suggestions that lead to null SRP.

Null SRP recovered through Suggestion: It is a plus if the suggestion can help a user to recover from the null SRP. Assume that the users' typed query lead her to a null SRP, which has query suggestion impression and a click on one of those suggestion leads to a non-null SRP. A recovery from the null SRP can be counted. The metric computes the percentage of recovery through query suggestion with respect to the total number of null SRP.

Besides the above metrics, several other evaluation metrics, which are more related to the purchase, can be tracked. For example, view-Through rate (percentage of query suggestion clicks followed by a click on view item), purchase-Through rate (percentage of query suggestion clicks followed by a purchase activity, such as bidding or buying), etc.

After the recommendation cleansing, the query suggestion can be recommended as at 1170.

In the area of search, presenting related searches (other users' searches that are related to the user's existing search) can be weighted by statistical probabilities. The statistical probabilities favor searches where the searcher was successful (e.g., as measured by the searcher making a purchase).

A special-purpose computer system builds and analyzes a graph of probabilities that maps how users search for items from node to node. When presenting related searches to the user, the related searches most likely to result in a successful outcome are ranked most highly and presented most prominently.

For example, if some people who searched for "foo" also searched for "bar", and some people who searched for "foo" also searched for "baz," but the people who searched for "baz" ultimately were more successful in finding something, then a query for "baz" will be presented as a better related search, even if more people who searched for "foo" subsequently searched for "bar."

Metrics for success can include: item views, item bids, or item purchases. Faceted navigation may be supported by the system. Suggestions may be presented to a user at the top of the page for navigational purposes (e.g., the goal is to direct the user to the right place), while further suggestions may be presented to the user at the bottom of the page for search engine optimization purposes. According to some example embodiments, a recommendation system may be based on several concepts. In one instance this may be mining user activity from user activity history (e.g., sojourner) logs. One could also build a graph from a user activity history which includes searches, bins, bids, ask seller a question, watches, views, offers. Each query seen in the user activity history is a node on this graph. Edges connecting queries are based on follow counts of queries in user sessions. Popularity of queries and user behavior in terms of engagement are properties on the edges of this graph. Prune the graph, based on edge properties to be able to get the best neighbors for every query which are likely to lead the user to purchases. All this may be done on Hadoop and may be easily scalable. Noise removal techniques like historical & current inventory count, or Porter's stemmer, may be applied to improve the quality of recommendations.

Figure 12:
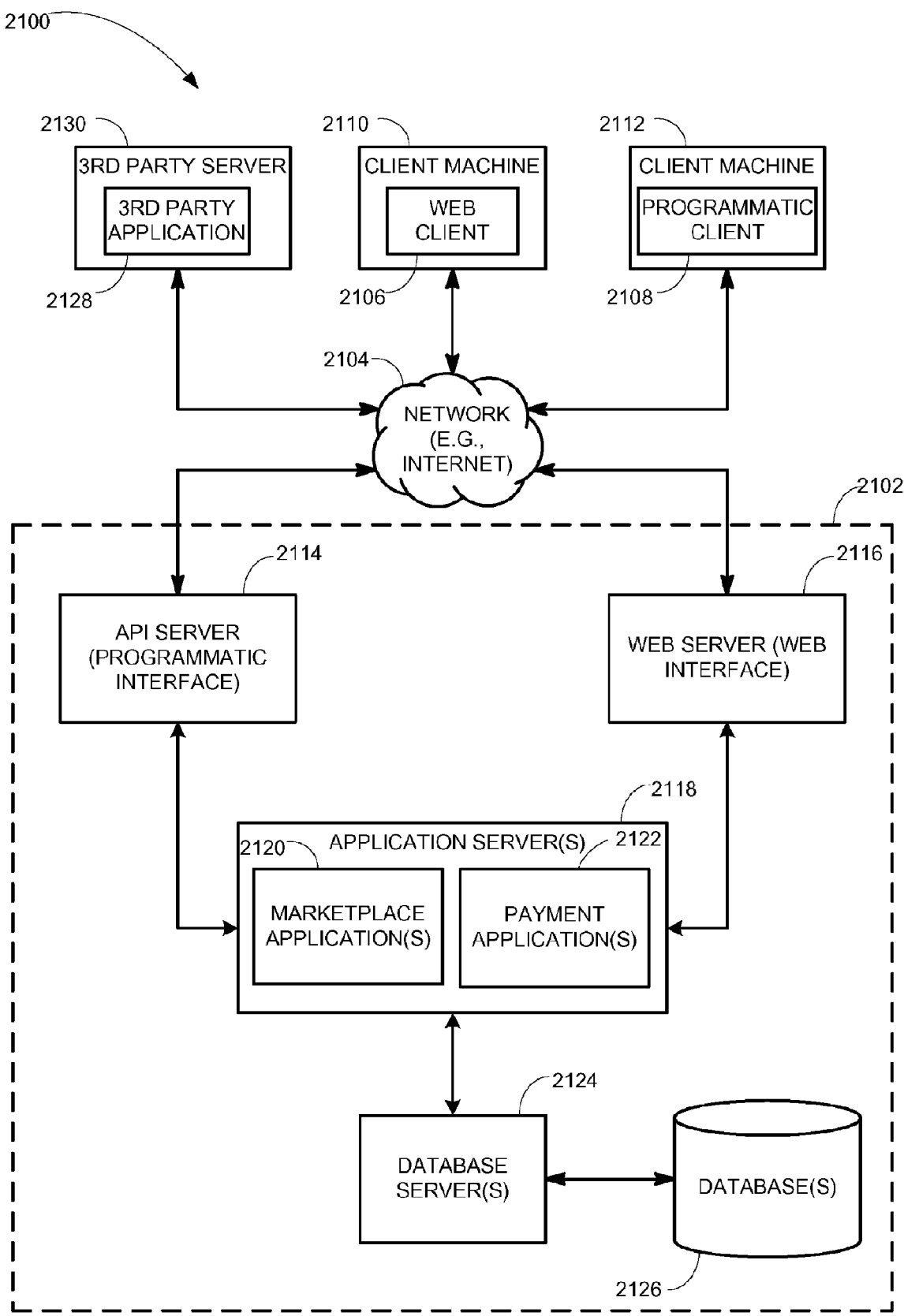
FIG. 12 is a network diagram depicting a network system, according to one embodiment, having a client server architecture configured for exchanging data over a network.

FIG. 12 is a network diagram depicting a client-server system 2100, within which one example embodiment may be deployed. By way of example, a network 2104 may include the functionality of the network 104, the provider 106 may be deployed within an application server 2118, and the client machine 102 may include the functionality of a client machine 2110 or a client machine 2112. The system 2100 may also be deployed in other systems.

A networked system 2102, in the example forms of a network-based marketplace or publication system, provides server-side functionality, via a network 2104 (e.g., the Internet or Wide Area Network (WAN)) to one or more clients. FIG. 12 illustrates, for example, a web client 2106 (e.g., a browser, such as the Internet Explorer browser developed by Microsoft Corporation of Redmond, Washington State), and a programmatic client 2108 executing on respective client machines 2110 and 2112.

An Application Program Interface (API) server 2114 and a web server 2116 are coupled to, and provide programmatic and web interfaces respectively to, one or more application servers 2118. The application servers 2118 host one or more marketplace applications 2120 and payment applications 2122. The application servers 2118 are, in turn, shown to be coupled to one or more databases servers 2124 that facilitate access to one or more databases 2126.

The marketplace applications 2120 may provide a number of marketplace functions and services to users that access the networked system 2102. The payment applications 2122 may likewise provide a number of payment services and functions to users. The payment applications 2122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 2120. While the marketplace and authentication providers 2120 and 2122 are shown in FIG. 12 to both form part of the networked system 2102, in alternative embodiments the authentication providers 2122 may form part of a payment service that is separate and distinct from the networked system 2102.

Further, while the system 2100 shown in FIG. 12 employs a client-server architecture, embodiments of the present invention are of course not limited to such an architecture, and could equally well find application in a distributed, or peer-to-peer, architecture system, for example. The various marketplace and authentication providers 2120 and 2122 could also be implemented as standalone software programs, which need not have networking capabilities.

The web client 2106 accesses the various marketplace and authentication providers 2120 and 2122 via the web interface supported by the web server 2116. Similarly, the programmatic client 2108 accesses the various services and functions provided by the marketplace and authentication providers 2120 and 2122 via the programmatic interface provided by the API server 2114. The programmatic client 2108 may, for example, be a seller application (e.g., the TurboLister™ application developed by eBay Inc., of San Jose, Calif.) to enable sellers to author and manage listings on the networked system 2102 in an off-line manner, and to perform batch-mode communications between the programmatic client 2108 and the networked system 2102.

FIG. 12 also illustrates a third party application 2128, executing on a third party server machine 2130, as having programmatic access to the networked system 2102 via the programmatic interface provided by the API server 2114. For example, the third party application 2128 may, utilizing information retrieved from the networked system 2102, support one or more features or functions on a website hosted by the third party. The third party may, for example, provide one or more promotional, marketplace or payment functions that are supported by the relevant applications of the networked system 2102.

Figure 13:
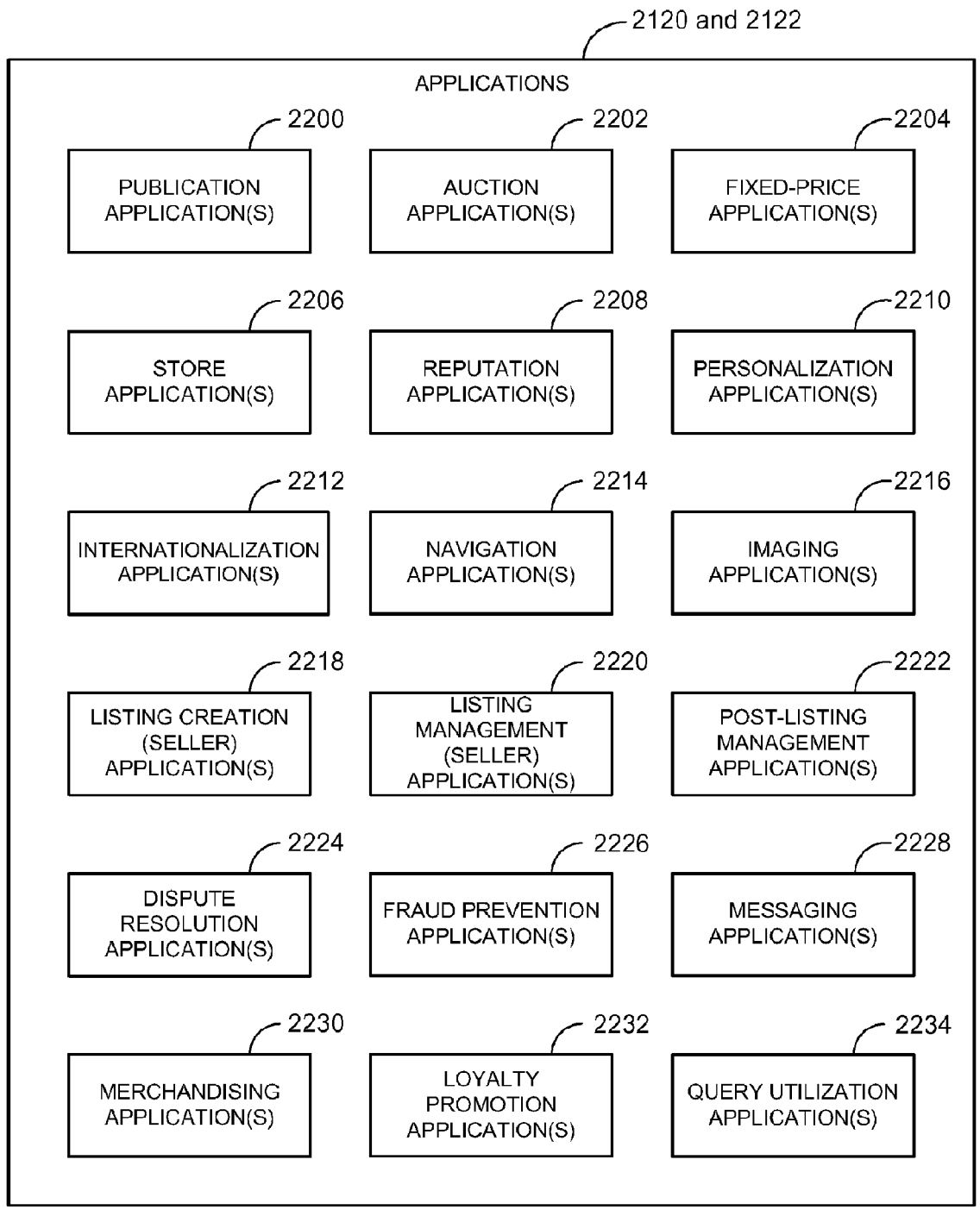
FIG. 13 is a block diagram illustrating an example embodiment of multiple network and marketplace applications, which are provided as part of the network-based marketplace.

FIG. 13 is a block diagram illustrating multiple applications 2120 and 2122 that, in one example embodiment, are provided as part of the networked system 2102 (see FIG. 12). The applications 2120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 2126 via the database servers 2124.

The networked system 2102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 2120 are shown to include at least one publication application 2200 and one or more auction applications 2202 which support auction-format listing and price setting mechanisms (e.g., English, Dutch, Vickrey, Chinese, Double, Reverse auctions etc.). The various auction applications 2202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 2204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 2206 allow a seller to group listings within a "virtual" store, which may be branded and otherwise personalized by and for the seller. Such a virtual store may also offer promotions, incentives and features that are specific and personalized to a relevant seller.

Reputation applications 2208 allow users that transact, utilizing the networked system 2102, to establish, build and maintain reputations, which may be made available and published to potential trading partners. Consider that where, for example, the networked system 2102 supports person-to-person trading, users may otherwise have no history or other reference information whereby the trustworthiness and credibility of potential trading partners may be assessed. The reputation applications 2208 allow a user, for example through feedback provided by other transaction partners, to establish a reputation within the networked system 2102 over time. Other potential trading partners may then reference such a reputation for the purposes of assessing credibility and trustworthiness.

Personalization applications 2210 allow users of the networked system 2102 to personalize various aspects of their interactions with the networked system 2102. For example a user may, utilizing an appropriate personalization application 2210, create a personalized reference page at which information regarding transactions to which the user is (or has been) a party may be viewed. Further, a personalization application 2210 may enable a user to personalize listings and other aspects of their interactions with the networked system 2102 and other parties.

The networked system 2102 may support a number of marketplaces that are customized, for example, for specific geographic regions. A version of the networked system 2102 may be customized for the United Kingdom, whereas another version of the networked system 2102 may be customized for the United States. Each of these versions may operate as an independent marketplace, or may be customized (or internationalized and/or localized) presentations of a common underlying marketplace. The networked system 2102 may accordingly include a number of internationalization applications 2212 that customize information (and/or the presentation of information) by the networked system 2102 according to predetermined criteria (e.g., geographic, demographic or marketplace criteria). For example, the internationalization applications 2212 may be used to support the customization of information for a number of regional websites that are operated by the networked system 2102 and that are accessible via respective web servers 2116.

Navigation of the networked system 2102 may be facilitated by one or more navigation applications 2214. For example, a search application (as an example of a navigation application) may enable key word searches of listings published via the networked system 2102. A browse application may allow users to browse various category, catalogue, or system inventory structures according to which listings may be classified within the networked system 2102. Various other navigation applications may be provided to supplement the search and browsing applications.

In order to make listings available via the networked system 2102 as visually informing and attractive as possible, the marketplace applications 2120 may include one or more imaging applications 2216 utilizing which users may upload images for inclusion within listings. An imaging application 2216 also operates to incorporate images within viewed listings. The imaging applications 2216 may also support one or more promotional features, such as image galleries that are presented to potential buyers. For example, sellers may pay an additional fee to have an image included within a gallery of images for promoted items.

Listing creation applications 2218 allow sellers conveniently to author listings pertaining to goods or services that they wish to transact via the networked system 2102, and listing management applications 2220 allow sellers to manage such listings. Specifically, where a particular seller has authored and/or published a large number of listings, the management of such listings may present a challenge. The listing management applications 2222 provide a number of features (e.g., auto-relisting, inventory level monitors, etc.) to assist the seller in managing such listings. One or more post-listing management applications 2222 also assist sellers with a number of activities that typically occur post-listing. For example, upon completion of an auction facilitated by one or more auction applications 2102, a seller may wish to leave feedback regarding a particular buyer. To this end, a post-listing management application 2202 may provide an interface to one or more reputation applications 2208, so as to allow the seller conveniently to provide feedback regarding multiple buyers to the reputation applications 2208.

Dispute resolution applications 2214 provide mechanisms whereby disputes arising between transacting parties may be resolved. For example, the dispute resolution applications 2224 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 2226 implement fraud detection and prevention mechanisms to reduce the occurrence of fraud within the networked system 2102.

Messaging applications 2228 are responsible for the generation and delivery of messages to users of the networked system 2102, such messages for example advising users regarding the status of listings at the networked system 2102 (e.g., providing "outbid" notices to bidders during an auction process or to provide promotional and merchandising information to users). Respective messaging applications 2228 may utilize any one have a number of message delivery networks and platforms to deliver messages to users. For example, messaging applications 2228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 2230 support various merchandising functions that are made available to sellers to enable sellers to increase sales via the networked system 2102. The merchandising applications 2230 also operate the various merchandising features that may be invoked by sellers, and may monitor and track the success of merchandising strategies employed by sellers.

The networked system 2102 itself, or one or more parties that transact via the networked system 2102, may operate loyalty programs that are supported by one or more loyalty/promotions applications 2232. For example, a buyer may earn loyalty or promotions points for each transaction established and/or concluded with a particular seller, and may be offered a reward for which accumulated loyalty points can be redeemed.

Query utilization applications 2234 may detect, classify, and/or rank query bursts. The query bursts may be detected based on information received from the applications 2200, 2202, 2204, 2206, 2214, 2216, 2218, 2220, 2222, 2230; however the query bursts may be detected based on information received from other applications.

Figure 14:
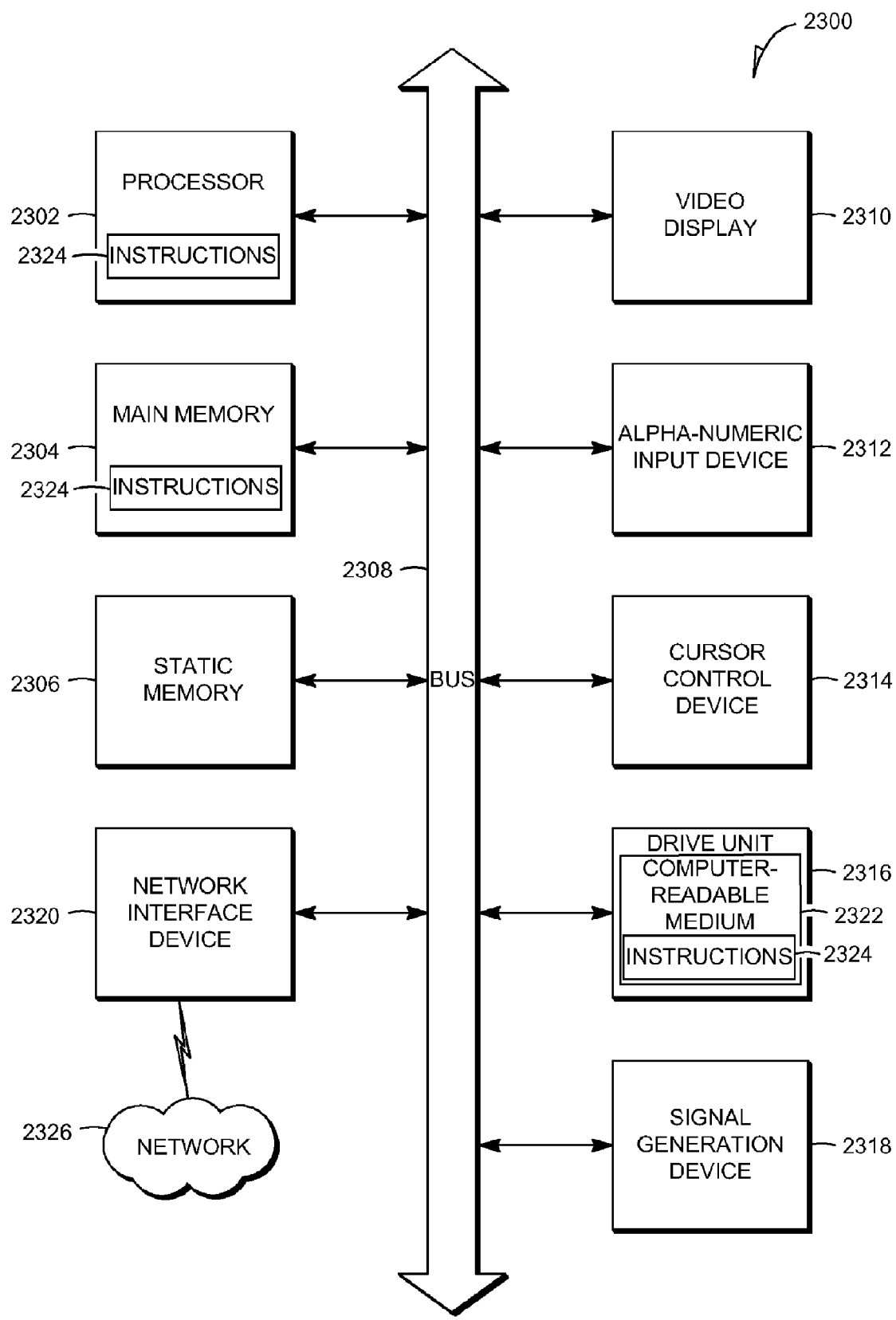
FIG. 14 is a block diagram diagrammatic representation of machine in the example form of a computer system within which a set of instructions for causing the machine to perform any one or more of the methodologies discussed herein may be executed.

FIG. 14 shows a diagrammatic representation of machine in the example form of a computer system 2300 within which a set of instructions may be executed causing the machine to perform any one or more of the methods, processes, operations, or methodologies discussed herein. The provider 106 may operate on one or more computer systems 2300. The client machine 102 may include the functionality of the one or more computer systems 2300.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2300 includes a processor 2302 (e.g., a central processing unit (CPU) a graphics processing unit (GPU) or both), a main memory 2304 and a static memory 2306, which communicate with each other via a bus 2308. The computer system 2300 may further include a video display unit 2310 (e.g., a liquid crystal display (LCD) or a cathode ray tube (CRT)). The computer system 2300 also includes an alphanumeric input device 2312 (e.g., a keyboard), a cursor control device 2314 (e.g., a mouse), a drive unit 2316, a signal generation device 2318 (e.g., a speaker) and a network interface device 2320.

The drive unit 2316 includes a machine-readable medium 2322 on which is stored one or more sets of instructions (e.g., software 2324) embodying any one or more of the methodologies or functions described herein. The software 2324 may also reside, completely or at least partially, within the main memory 2304 and/or within the processor 2302 during execution thereof by the computer system 2300, the main memory 2304 and the processor 2302 also constituting machine-readable media.

The software 2324 may further be transmitted or received over a network 2326 via the network interface device 2320.

While the machine-readable medium 2322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

In an example embodiment, a rate of a plurality of queries to a data source may be determined for each of a plurality of time periods. The plurality of queries may be associated with a term. A cost may be associated with a normal-to-deviated query state transition and a deviated-to-normal query state transition. A normal query state or a deviated query state may be assigned to a particular query on a particular time period of the plurality of time periods based on the rate of queries for the particular time period and the cost of the normal-to-deviated query state transition and the deviated-to-normal query state transition. A query burst may be identified during the plurality of time periods based on assignment of the normal query state or the deviated query state to the plurality of queries. The query burst may have the normal query state, the normal-to-deviated query state transition, and the deviated query state during a time period.

In an example embodiment, a rate of a plurality of queries to a data source may be determined for a plurality of time periods. The plurality of queries may be associated with a term. Cost minimization analysis may be performed on the plurality of queries for the plurality of time periods. A result of the performing cost minimization analysis may be stored. A plurality of additional queries to the data source may be monitored. The plurality of additional queries may be associated with the term. The cost minimization analysis may be performed on the plurality of additional queries for an additional time period. A normal query state or a deviated query state may be assigned to a particular query for the additional time period based on the cost minimization analysis performed on the plurality of queries and the plurality of additional queries. A query burst may be identified during the plurality of time periods and the additional time period based on assignment of the normal query state or the deviated query state for the particular query. The query burst may have the normal query state, the normal-to-deviated query state transition, and the deviated query state during a time period.

In an example embodiment, a query burst may be detected among a plurality of queries to a data source. The query burst may be converted using a wavelet transform. A clustering technique may be applied to a result of the converting. The query burst may be classified based on the applying of the clustering technique.

In an example embodiment, a query burst may be detected among a plurality of queries to a data source. A graphic query formation may be identified among the plurality of queries based on the query burst. The query burst may be ranked based on the graphic query formation.

Thus, methods and systems for query utilization have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for providing query suggestions for a user comprising:
   using a computer processor and storage,
   receiving a query log comprising a number of user sessions on an e-commerce site, the sessions including a plurality of sets of queries that have been executed by users of the e-commerce site during the user sessions, some of the sets of queries including query transitions, followed by a purchase related event;
   cleaning and normalizing the query log;
   generating from the cleaned and normalized query log stationary scores and transition scores of at least some of the plurality of sets, the transition scores comprising ordered query pairs;
   building a set of query suggestions from the ordered query pairs;
   computing similarity scores of at least some of the set of query suggestions to determine whether individual ones of the at least some of the set of query suggestions meet a predetermined assurance level;
   including as elements of the set query suggestions that meet the predetermined assurance level; and
   mixing and ranking the set of query suggestions in accordance with a user behavior that is to be optimized, the ranking comprising using a first weighting with a popularity score and a second weighting with a purchase efficiency score.

2. The method of claim 1, the stationary scores and the transition scores are computed using one of a popularity score and a purchase efficiency score.

3. The method of claim 2 wherein the purchase efficiency score is the linear combination of a count of different purchase related events.

4. The method of claim 1, wherein the similarity is a semantic similarity.

5. The method of claim 1, further including normalizing the scores for the set of query suggestions.

6. The method of claim 5, wherein the normalizing comprises dividing the number of query transitions by the number of users that practice the query transition.

7. The method of claim 1, wherein the suggestion mixing comprises one of refinement mixing and related mixing.

8. The method of claim 7, wherein the refinement mixing includes adding one or more terms in one of the sets of queries to constrain a search that uses the query suggestion.

9. The method of claim 1, wherein the set of query suggestions includes a first query suggestion and further including cleaning the set of query suggestions by deleting the first query suggestion based on a predetermined probability of returning a null search results page on an e-commerce site.

10. A computer-readable storage device having embedded therein a set of instructions which, when executed by one or more processors of a computer, causes the computer to execute operations comprising:
   receiving a query log comprising a number of user sessions on an e-commerce site, the sessions comprising a plurality of sets of queries that have been executed by users of the e-commerce site during the user sessions, some of the sets of queries including query transitions, followed by a purchase related event;

cleaning and normalizing the query log;

generating from the cleaned and normalized query log stationary scores and transition scores of at least some of the plurality of sets, the transition scores comprising ordered query pairs;

building a set of query suggestions from the ordered query pairs;

computing similarity scores of at least some of the set of query suggestions to determine whether individual ones of the at least some of the set of query suggestions meet a predetermined assurance level;

including as elements of the set query suggestions that meet the predetermined assurance level; and mixing and ranking the set of query suggestions in accordance with a user behavior that is to be optimized, the ranking comprising using a first weighting with a popularity score and a second weighting with a purchase efficiency score.

11. The computer readable storage device of claim 10, wherein stationary scores and the transition scores computed using one of a popularity score and a purchase efficiency score.

12. The computer readable storage device of claim 11, wherein the purchase efficiency score is a linear combination of a count of different purchase related events.

13. The computer readable storage device of claim 10, wherein the similarity is a semantic similarity.

14. The computer readable storage device of claim 10, the operations further including normalizing the scores for the set of query suggestions.

15. The computer readable storage device of claim 14, wherein the normalizing comprises dividing the number of query transitions by the number of users that practice the query transition.

16. The computer readable storage device of claim 10, wherein the suggestion mixing comprises one of refinement mixing and related mixing.

17. The computer readable storage device of claim 16, wherein refinement mixing includes adding one or more terms in one of the sets of queries to constrain a search that uses the query suggestion.

18. The computer readable storage device of claim 10, wherein the set of query suggestions includes a first query suggestion and further including cleaning the query suggestions by deleting the first query suggestion based on a predetermined probability of returning a null search results page on an e-commerce site.

19. A system for providing query suggestions for a user comprising:

at least one hardware processor configured to include:

a query log module configured to receive a query log comprising a number of user sessions on an e-commerce site, the sessions comprising training data including a sequence of a plurality of sets of queries that have been executed by users of the e-commerce site during the user sessions, some of the sets of queries including query transitions, followed by a purchase related event;

a query log cleaning and normalization module configured to clean and normalize the query log using a cleaning and normalizing module;

a scoring module configured to generate from the cleaned and normalized query log stationary scores and transition scores of at least some of the plurality of sets, the transition scores comprising ordered query pairs;

a query suggestion build module configured to build a set of query suggestions from the ordered query pairs;

a similarity computation module configured to compute similarity scores of at least some of the set of query suggestions to determine whether individual ones of the at least some of the sets of query suggestions meet a predetermined assurance level, the similarity computation module further configured to include as elements the set of query suggestions that meet the predetermined assurance level; and a recommendation compilation module configured to mix and rank the set of query suggestions in accordance with a user behavior that is to be optimized, the ranking comprising using a first weighting with a popularity score and a second weighting with a purchase efficiency score.

20. A method of generating suggestions for search, the method comprising:

using a computer processor and storage, mining user query activity from user activity history logs of user sessions on an e-commerce site;

analyzing, and building a probability graph from a user query activity history log of user queries that have been executed by users of the e-commerce site during the user query activity which includes at least one of searches, Buy It Now actions, bids, ask seller a question, watches, views, and offers, wherein at least some queries are seen in the user query activity history log as a node on the graph, edges connecting the at least some queries are based on follow counts of queries in user sessions, and popularity of queries and user behavior in terms of engagement are properties seen as edges of the graph; and pruning the graph, based on edge properties to obtain the best neighbors for every query which improve popularity of queries and user behavior in terms of engagement.

21. The method of claim 20, the method employing Hadoop Distributed File System ™clustering.

22. The method of claim 20, the method employing noise removal techniques including one of historical inventory count, current inventory count, and a stemming algorithm.

23. A computer-readable storage device having embedded therein a set of instructions which, when executed by one or more processors of a computer, causes the computer to execute operations for generating suggestions for search, the operations comprising:

mining user query activity comprising queries that have been executed by users of the e-commerce site during the user sessions from user query activity history logs of usage of the e-commerce site;

analyzing, and building a probability graph from a user query activity history log which includes at least one of searches, Buy It Now actions, bids, ask seller a question, watches, views, and offers, wherein at least some queries being seen in the user query activity history log as a node on the graph, edges connecting the at least some queries are based on follow counts of queries in user sessions, and popularity of queries and user behavior in terms of engagement are properties seen as edges of the graph; and pruning the graph, based on edge properties to obtain the best neighbors for every query which improve popularity of queries and user behavior in terms of engagement.

* * * * *

UNITED STATES PATENT AND TRADEMARK OFFICE
CERTIFICATE OF CORRECTION

| | | |
|---|---|---|
| PATENT NO. | : 8,954,422 B2 | Page 1 of 1 |
| APPLICATION NO. | : 13/193586 | |
| DATED | : February 10, 2015 | |
| INVENTOR(S) | : Hasan et al. | |

It is certified that error appears in the above-identified patent and that said Letters Patent is hereby corrected as shown below:

In the Claims

In column 22, line 23, in Claim 20, delete "from" and insert --from,--, therefor In column 22, line 30, in Claim 20, after "a", delete "¶", therefor In column 22, line 33, in Claim 20, after "of", delete "¶", therefor In column 22, line 36, in Claim 20, after "are", delete "¶", therefor In column 22, line 55, in Claim 23, delete "from" and insert --from,--, therefor In column 22, line 63, in Claim 23, after "follow", delete "¶", therefor In column 22, line 66, in Claim 23, after "are", delete "¶", therefor Signed and Sealed this
Twenty-ninth Day of September, 2015

Michelle K. Lee
*Director of the United States Patent and Trademark Office*